(No Model.)
G. LINDNER & J. DORSCH.
FOOD STRAINER.
No. 252,883. Patented Jan. 31, 1882.
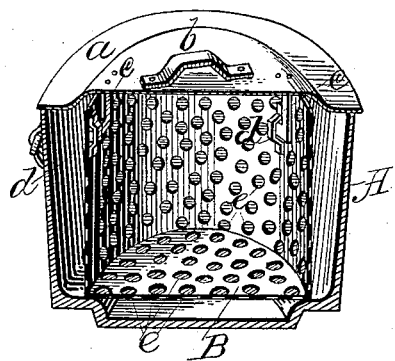
Witnesses:
E. G. Asmus
F. H. West
Inventors:
George Lindner
John Dorsch
By Jas. P. Emrie
Attorney.

United States Patent Office.

GEORGE LINDNER, OF CANANDAIGUA, NEW YORK, AND JOHN DORSCH, OF MILWAUKEE, WISCONSIN.

FOOD-STRAINER.

SPECIFICATION forming part of Letters Patent No. 252,883, dated January 31, 1882.

Application filed October 15, 1881. (No model.)

*To all whom it may concern:*

Be it known that we, GEORGE LINDNER, of Canandaigua, in the county of Ontario, State of New York, citizen of the United States, and John Dorsch, citizen of the United States, residing at Milwaukee, in the county of Milwaukee and State of Wisconsin, have invented certain new and useful Improvements in Food-Strainers; and we do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

The object of our invention is to provide a device within which food may be retained while boiling, and by which it may be all simultaneously removed from the kettle and strained without inverting the kettle or removing the water therefrom, thereby avoiding the inconvenience and danger from scalding which arises in pouring the water from the kettle in the ordinary manner.

Our invention consists, first, in providing a thin metallic vessel having closely perforated sides and bottom for the reception of the food, which vessel fits loosely within the kettle and rests upon the shoulders and bottom of the same, and is provided on opposite sides with lifting loops or hooks, as shown; and in the peculiar construction of the cover, whereby it is adapted to engage in the loops or hooks formed on said receptacle, and whereby said receptacle may be raised and withdrawn from the kettle with the cover.

Our invention is further explained by reference to the accompanying drawing, in which is represented a vertical section.

Like parts are represented by the same reference-letters.

A is the kettle. B is a food-receptacle or strainer. *a* is the cover.

The sides and bottom of the strainer are provided with perforations C, through which the boiling water has free access to the food within the strainer, and through which the water escapes when the food is removed from the kettle.

*c c* are hooks, formed opposite to each other near the edge of the cover. *d d* are loops, which are attached opposite to each other upon the upper edge of the strainer, said hooks being adapted by turning said cover to engage in said loops. It is obvious that by this arrangement the cover is adapted to serve as a handle for removing the strainer and food from the kettle, as well as for the ordinary purpose of a cover.

The strainer B may be made of wire instead of sheet metal, if desired.

Having thus described our invention, what we claim as new, and desire to secure by Letters Patent, is—

1. The combination of the receptacle B, having perforations *e* and loops *d d*, with cover *a*, provided with hooks *c c*, substantially as set forth.

2. The combination of the strainer B, loops *d d*, hooks *c c*, cover *a*, and kettle A, all substantially as and for the purpose specified.

In testimony whereof we affix our signatures in presence of two witnesses.

GEORGE LINDNER.
JOHN DORSCH.

Witnesses:
JAS. B. ERWIN,
K. SHAWVAN.